United States Patent [19]

Barton et al.

[11] 4,394,031
[45] Jul. 19, 1983

[54] EASILY MOUNTABLE SWINGABLE-ARM DRAW-PIN RETAINER

[76] Inventors: Roy C. Barton, 724 Main St.; Dale A. Smith, Box 169, both of Mt. Vernon, Ill. 62864

[21] Appl. No.: 153,157

[22] Filed: May 27, 1980

[51] Int. Cl.³ .............................................. B60D 1/02
[52] U.S. Cl. .................................... 280/515; 172/677; 280/477; 280/504; 280/507; 403/317
[58] Field of Search .................................. 280/477–515; 24/211 R, 212, 221 K, 221 A; 292/209; 172/677, 678–680, 753; 403/317, 316, 315

[56] References Cited

U.S. PATENT DOCUMENTS

| | | | |
|---|---|---|---|
| 1,501,867 | 7/1924 | Sadler | 24/221 K |
| 2,397,964 | 4/1946 | Hiniker | 280/515 X |
| 2,654,613 | 10/1953 | Blair | 280/515 |
| 2,697,618 | 12/1954 | Hulstedt | 280/515 |
| 2,794,657 | 6/1957 | Anderson | 280/515 X |
| 3,514,820 | 6/1970 | Rogg | 24/221 R |
| 3,774,149 | 11/1973 | Bennett | 280/477 |
| 3,794,357 | 2/1974 | Frye | 280/507 X |

FOREIGN PATENT DOCUMENTS 1025012  1/1978  Canada .............................. 280/515

Primary Examiner—Joseph F. Peters, Jr.
Assistant Examiner—Mitchell J. Hill
Attorney, Agent, or Firm—Ralph F. Staubly

[57] ABSTRACT

To prevent personal injury and property damage by accidental displacement of a hitch tow-pin, an easily mountable unit has an arm horizontally swingable to and from a position above the upper end of the conventional tow-pin of a clevis-type hitch. The pivot pin for the swingable arm can also serve as part of the unit's mounting structure by extending through a bore in, and anchored to, a draw bar. Or the pivot pin can be fixed to a sleeve slidable over a draw bar. Each species employs a detent device to prevent accidental arm movement away from its draw-pin-retaining position.

1 Claim, 6 Drawing Figures

FIG. 1

U.S. Patent  Jul. 19, 1983  4,394,031
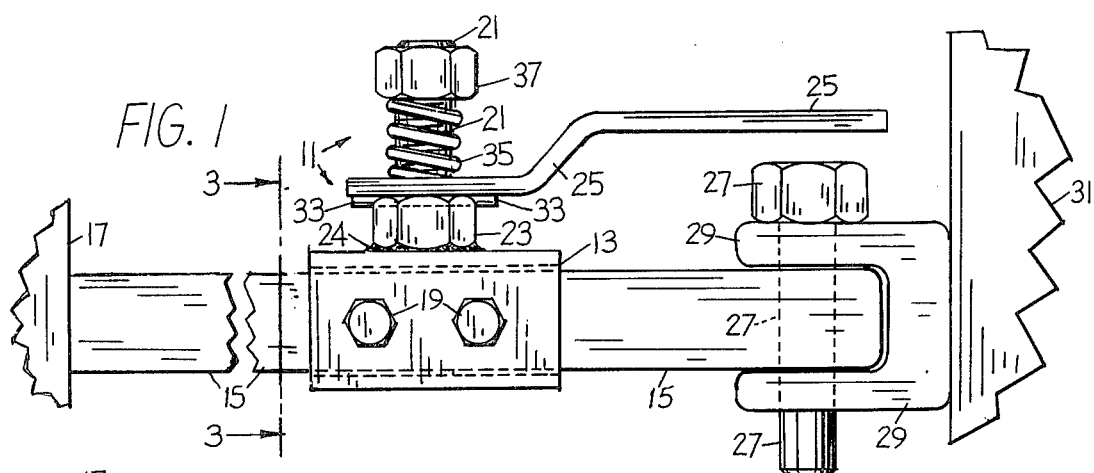
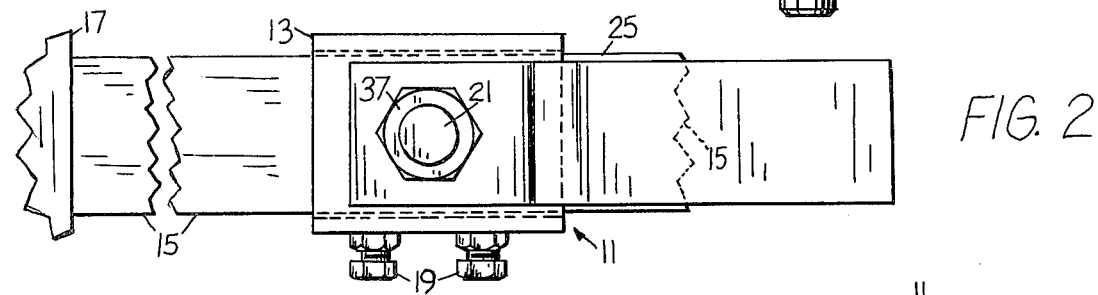
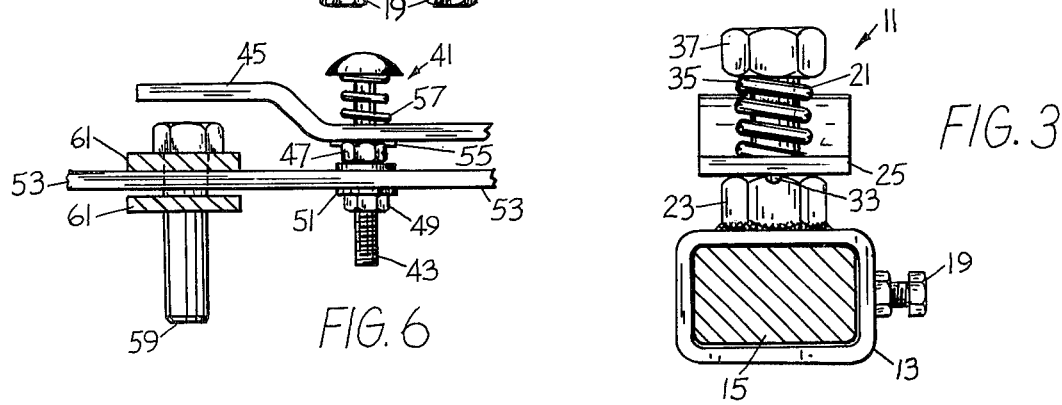
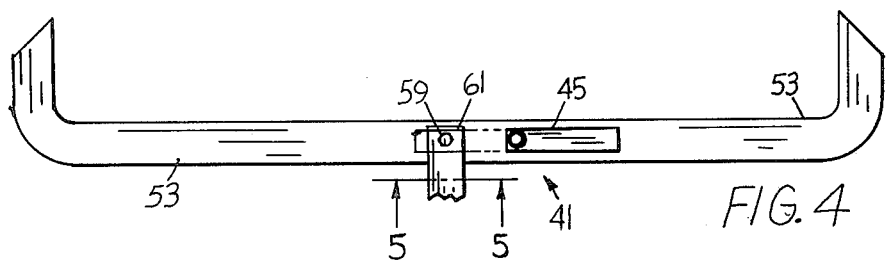
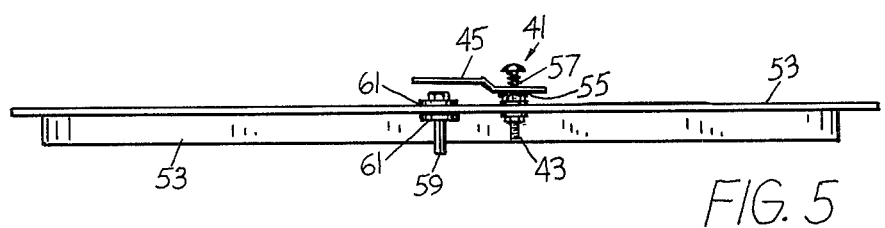

EASILY MOUNTABLE SWINGABLE-ARM DRAW-PIN RETAINER

BACKGROUND AND OBJECTS OF THE INVENTION

It is known to employ a swingable draw-pin-retaining arm in combination with a specially constructed hitch draw-pin (U.S. Pat. No. 2,654,613 to Blair et al). But is is not known to provide a swingable-arm unit that is easily attachable without drilling to a conventional clevis-type hitch and is swingable to retainingly overlie a conventional draw-pin therein. It is the principal object of the present invention to provide such a unit. Other objects and advantages will become apparent as the following detailed description proceeds.

BRIEF DESCRIPTIONS OF THE DRAWING FIGURES

FIG. 1 is an elevational view of a preferred embodiment of the invention.

FIG. 2 is a plan view of the disclosure of FIG. 1.

FIG. 3 is an elevational end view in section taken on the line 3—3 of FIG. 1.

FIG. 4 is a plan view of a second species of the invention, with its arm in inoperative position.

FIG. 5 is an elevational view of the showing of FIG. 4 but with the arm swung to its draw-pin-retaining position.

FIG. 6 is an enlarged elevational view of the central fifth of FIG. 5, in section on the line 5—5 of FIG. 4.

DETAILED DESCRIPTION

With reference now to FIGS. 1–3, the numeral 11 generally designates the first species of the tow-pin-retaining unit. The unit 11 comprises a sleeve 13 of rectangular cross-section which can be slid over the right end of a conventional tow-bar 15 that is fixed to a towed-vehicle 17. The sleeve 13 is clamped to the tow-bar 13 by one or more set-screws 19. An upright pivot pin 21 and a nut 23 are fastened to the top surface of the sleeve 13 as by welding at 24.

An offset-bent arm 25 is journaled on the pivot pin 21 for horizontal swinging so that its free end can retainingly overlie the top of a conventional tow-pin 27 which hitch-connects the tow-bar 15 to a clevis 29 attached to a towing vehicle 31.

The arm 25 is yieldably held in its tow-pin-retaining position of FIG. 1 by a detent formed by two semicylindrical pins 33 welded to the under surface of the arm 25 and engageable in radial grooves in the upper surface of the nut 23. A coil spring 35 (which is compressed between the top surface of the arm 25 and a nut 37 fixed to the upper end of the pivot pin 21) presses the detent pins 33 into their mating radial grooves to prevent inadvertent movement (e.g. by vibration) of the arm away from its two-pin-retaining position.

In FIGS. 4 thru 6 the numeral 41 generally designates a unit embodying a second species of the invention. The unit 41 comprises a bolt 43 which constitutes the pivot pin for its horizontally swingable arm 45. The bolt 43 also forms, along with nuts 47 and 49 and washers 51, the means for easily mounting the unit 41 on a transverse (angle-bar) tow-bar 53 which is adapted for attachment across the rear end of a towing vehicle (not shown).

The top surface of the nut 47 is radially grooved to receive therein semicylindrical pins 55 which, aided by a compression spring 57, constitute a detent for yieldably holding the arm in its position of FIG. 5 for retaining a conventional draw-pin 59 as shown in FIG. 5. FIG. 5 shows the draw-pin 59 coupling a clevis 61 to the transverse tow-bar 53.

The invention having been described, what is claimed is:

1. In a tow-hitch having a bar attachable to a first vehicle, a therewith-mating clevis attachable to a second vehicle, and a conventional hitch tow-pin couplingly insertable downwardly through alined bores in said bar and said clevis, the improvement comprising: a tow-pin-retaining fully assembled unit having a vertically disposable pivot pin, means for fixing said pivot pin to tow-hitch structure so as to be closely adjacent the axis of said tow-pin in its hitch-coupling arrangement, an arm mounted on said pivot pin for horizontal swinging to and from a position closely above the top of said tow-pin, and detent means for yieldably holding said arm in its tow-pin-overlying and -retaining position, said tow-pin-retaining unit comprising a short sleeve telescopically slidable over a conventional drawbar, said pivot pin being firmly fastened to the top of said sleeve, said means for fixing being set screws for releasably anchoring said sleeve to said draw-bar, and said detent means comprising a nut fixed to said pivot pin and radially grooved on its arm-facing surface, rounded protuberances on said arm for engaging in the grooves of said nut, and a coil spring around said pivot pin biasing said arm toward said nut.

* * * * *